US012570235B2

(12) United States Patent
Ahle et al.

(10) Patent No.: US 12,570,235 B2
(45) Date of Patent: Mar. 10, 2026

(54) HYDRAULIC SYSTEM AND PASSENGER RESTRAINT SYSTEM

(71) Applicant: HAWE Hydraulik SE, Aschheim (DE)

(72) Inventors: Alexander Ahle, Aschheim (DE);
Sebastian Muthig, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 19/022,276

(22) Filed: Jan. 15, 2025

(65) Prior Publication Data

US 2025/0236258 A1     Jul. 24, 2025

(30) Foreign Application Priority Data

Jan. 24, 2024     (DE) ..................... 10 2024 200 630.0

(51) Int. Cl.
B60R 22/48 (2006.01)
B60R 22/02 (2006.01)
(Continued)

(52) U.S. Cl.
CPC .............. B60R 22/48 (2013.01); B60R 22/02 (2013.01); F15B 1/02 (2013.01); F15B 1/024 (2013.01);
(Continued)

(58) Field of Classification Search
CPC ........ F15B 1/024; F15B 15/088; F15B 15/14; F15B 15/149; F15B 2015/206;
(Continued)

(56) References Cited

U.S. PATENT DOCUMENTS 4,005,877 A * 2/1977 Humphries .............. A63G 7/00
280/748
6,115,965 A * 9/2000 Jennings ................. F15B 21/14
49/340
(Continued)

FOREIGN PATENT DOCUMENTS

| DE | 2518715 A1 | 9/1976 |
| DE | 102019216083 A1 | 4/2021 |
| DE | 102020125192 A1 | 3/2022 |
| DE | 102020131679 A | 6/2022 |
| WO | 2019229183 A1 | 12/2019 |

*Primary Examiner* — Michael Leslie
(74) *Attorney, Agent, or Firm* — DINSMORE & SHOHL LLP

(57) ABSTRACT

A hydraulic system for a passenger restraint device includes a hydraulic pump and a hydraulic section. The hydraulic section includes a hydraulic accumulator, a valve arrangement and a hydraulic cylinder unit with a piston. The valve arrangement is connected to the hydraulic pump, the hydraulic accumulator and the hydraulic cylinder unit. The piston can be moved between an open position and a first closed position. The hydraulic pump can pressurize the hydraulic cylinder unit so that the piston moves from the first closed position to the open position. The hydraulic accumulator is configured so that the piston moves from the open position to the first closed position. The hydraulic cylinder unit can be pressurized in a first switching position of the valve arrangement with a first pressure stage and in a second switching position of the valve arrangement with a second pressure stage lower than the first pressure stage.

15 Claims, 3 Drawing Sheets

(51) Int. Cl.

| | |
|---|---|
| *F15B 1/02* | (2006.01) |
| *F15B 13/02* | (2006.01) |
| *F15B 15/14* | (2006.01) |
| *A63G 7/00* | (2006.01) |
| *F15B 15/26* | (2006.01) |

(52) U.S. Cl.

CPC .......... *F15B 13/021* (2013.01); *F15B 13/024* (2013.01); *F15B 15/14* (2013.01); *A63G 7/00* (2013.01); *F15B 2015/268* (2013.01); *F15B 2211/205* (2013.01); *F15B 2211/212* (2013.01)

(58) Field of Classification Search

CPC .......... F15B 2015/268; F15B 2211/205; F15B 2211/212

See application file for complete search history.

(56) References Cited

U.S. PATENT DOCUMENTS

| | | | | |
|---|---|---|---|---|
| 6,385,969 | B1 * | 5/2002 | Huber .................. | F15B 11/028 |
| | | | | 60/413 |
| 8,567,185 | B1 * | 10/2013 | Theobald ................ | B25J 9/144 |
| | | | | 901/22 |
| 10,066,645 | B2 * | 9/2018 | Schlemmer ......... | F15B 15/1476 |
| 10,859,100 | B2 * | 12/2020 | Schaber ............... | F15B 11/022 |
| 11,007,960 | B1 * | 5/2021 | Syrcle .................. | F15B 15/204 |
| 11,180,244 | B2 * | 11/2021 | Evans ................... | F15B 15/06 |
| 11,371,535 | B2 * | 6/2022 | Shimada ................ | E02F 3/422 |
| 11,465,062 | B2 * | 10/2022 | Ahle ....................... | A63G 7/00 |
| 11,919,466 | B2 * | 3/2024 | Ahle ....................... | A63G 7/00 |
| 2025/0222365 | A1 * | 7/2025 | Hasner ............... | B61D 33/0092 |

* cited by examiner

HYDRAULIC SYSTEM AND PASSENGER RESTRAINT SYSTEM

CROSS REFERENCE TO RELATED APPLICATION

This application claims the priority benefit from German Patent Application No. 10 2024 200 630.0, filed on Jan. 24, 2024, the entire contents of which is incorporated herein by reference in its entirety.

FIELD

The present disclosure relates to a hydraulic system for a passenger restraint device and to a passenger restraint system comprising at least one passenger restraint device with such a hydraulic system.

BACKGROUND

Such passenger restraint devices are used in particular for rides such as roller coasters, simulators or other amusement facilities. In some cases, considerable forces and accelerations act on the passengers in the rides. For safety reasons, passenger restraint devices are therefore provided to hold passengers in place on the passenger seats they occupy. The passenger restraint device regularly has a hydraulically operated restraint bar for retracting and extending it. If the restraint bar is retracted, the passenger restraint device is closed so that the passenger is fixed in the passenger seat. However, if the restraint bar is extended, the passenger restraint device is open so that the passenger can enter and exit the passenger seat.

A hydraulic system is used to open and close the passenger restraint system. For this purpose, such a hydraulic system usually comprises a hydraulic pump, a hydraulic accumulator and a hydraulic cylinder unit with a piston. The piston is movably disposed within the hydraulic cylinder unit in order to adjust the passenger restraint device. To open the passenger restraint device, the piston is pressurized by the hydraulic pump. To close it, on the other hand, the piston is pressurized by the hydraulic accumulator.

Corresponding hydraulic systems are known from the state of the art, for example from WO 2019/229183 A1, and regularly have fixed, for example lockable, closed positions of the restraint bar. However, due to different sizes or body circumferences of the passengers, fixed closed positions can lead to inadequate or excessive restraint of the passengers. This leads to a lack of safety and discomfort for passengers.

SUMMARY

The embodiments of a hydraulic system for a passenger restraint device are provided. According to one embodiment. The hydraulic system includes a hydraulic pump and a hydraulic section. The hydraulic section includes a hydraulic accumulator, a valve arrangement and a hydraulic cylinder unit with a piston. The valve arrangement is connected to the hydraulic pump, the hydraulic accumulator and the hydraulic cylinder unit. The piston is movable between an open position and a first closed position. The hydraulic pump is configured to pressurize the hydraulic cylinder unit so that the piston moves from the first closed position to the open position. The hydraulic accumulator is configured to pressurize the hydraulic cylinder unit so that the piston moves from the open position to the first closed position. The valve arrangement can be switched into at least a first switching position and a second switching position. The hydraulic cylinder unit is pressurized by the hydraulic pump in the first switching position with a first pressure stage and the hydraulic cylinder unit is pressurized by the hydraulic pump in the second switching position with a second pressure stage, where the second pressure stage is lower than the first pressure stage.

In an embodiment, the valve arrangement includes a first pressure relief valve and a first directional control valve. The first directional control valve blocks a flow path to the first pressure relief valve in the first switching position of the valve arrangement and the first directional control valve opens the flow path to the first pressure relief valve in the second switching position of the valve arrangement, where the first pressure relief valve is configured to set the second pressure stage.

In an embodiment, the valve arrangement further includes a second directional control valve and a second pressure relief valve, where the valve arrangement can be switched into a third switching position and the hydraulic cylinder unit can be pressurized by the hydraulic pump in the third switching position with a third pressure stage, in that the second directional control valve in the third switching position blocks the flow path to the first pressure relief valve and releases it to the second pressure relief valve. The second pressure relief valve is configured to set the third pressure stage.

In one embodiment, the hydraulic accumulator is configured to pressurize the hydraulic cylinder unit with a fourth pressure stage and the fourth pressure stage is lower than the first pressure stage.

In one embodiment, the fourth pressure stage of the hydraulic accumulator is lower than the second pressure stage and the third pressure stage is preferably lower than the fourth pressure stage.

In one embodiment, the hydraulic cylinder unit is configured as a differential cylinder, and the hydraulic cylinder unit includes a hydraulic cylinder housing with an interior. The piston is movably disposed in the interior of the hydraulic cylinder housing, and the piston separates the interior of the hydraulic cylinder housing into a first working chamber and a second working chamber, where the first working chamber is connected to the hydraulic accumulator and the second working chamber is connected to the hydraulic pump.

In one embodiment, the valve arrangement includes a third directional control valve between the hydraulic cylinder unit and the hydraulic accumulator. The third directional control valve can be switched between a through position and a blocking position and the third directional control valve blocks the flow path from the hydraulic cylinder unit to the hydraulic accumulator in the blocking position, but releases the flow path from the hydraulic accumulator to the hydraulic cylinder unit.

In one embodiment, the piston can be moved manually from the first closed position to a second closed position. The first closed position is located between the open position and the second closed position.

In one embodiment, when the piston is moved from the open position into the first closed position, the valve arrangement switches into the third switching position. The valve arrangement switches to the second switching position when the piston is moved from the first closed position to the second closed position.

The first closed position of the piston may be adjustable.

In one embodiment, the hydraulic section has a detection unit and a control unit connected to the detection unit, so that the first closed position of the piston can be set in the control unit or the movement of the piston can be switched off by the hydraulic accumulator from the open position into the first closed position.

In one embodiment, the hydraulic section is a first hydraulic section and the hydraulic system includes at least one second hydraulic section identical to the first hydraulic section. The first hydraulic section is connected to the second hydraulic section in such a way that the piston of the first hydraulic section can be moved independently of a piston of the second hydraulic section and the at least one second hydraulic section is connected to the hydraulic pump.

A passenger restraint system is also provided including at least one passenger restraint device and a hydraulic system according to the embodiments disclosed herein.

BRIEF DESCRIPTION

DETAILED DESCRIPTION

Figure 1:
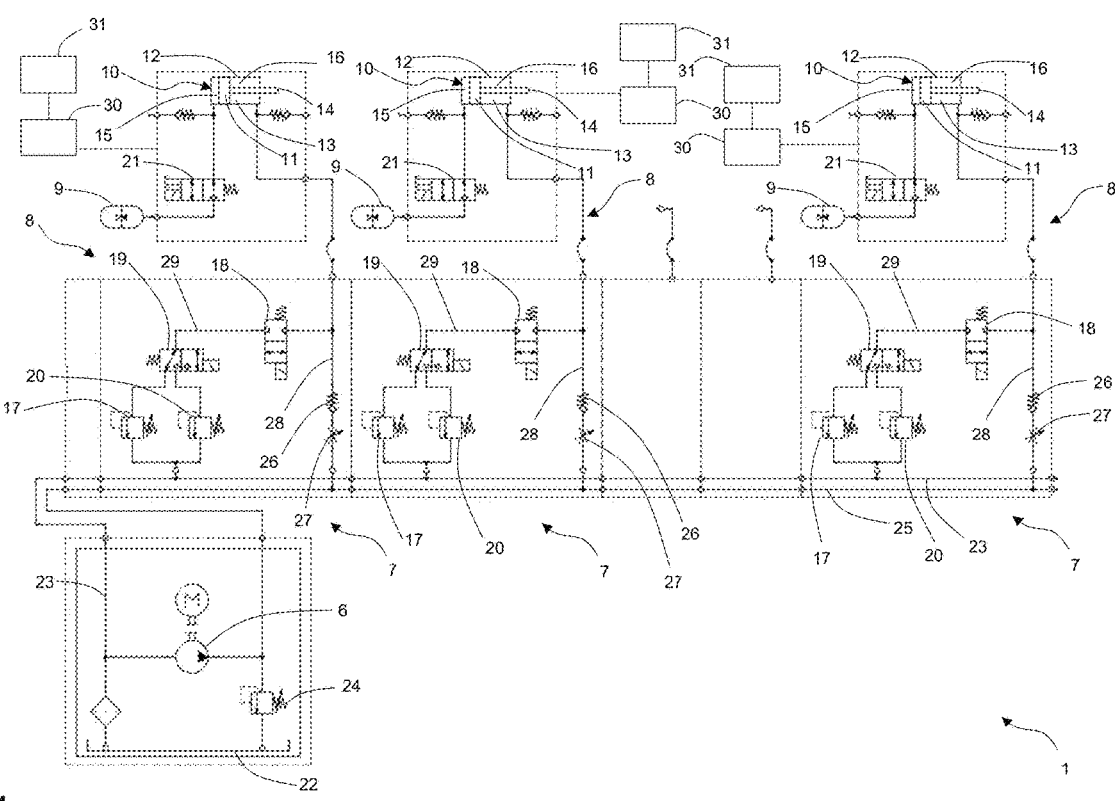
FIG. 1 is a hydraulic circuit diagram of a hydraulic system according to the present disclosure.

A passenger restraint device in the sense of the present disclosure is a restraint device for passengers in 4D cinemas, simulators, VR rides and amusement rides such as roller coasters or roundabout rides. Consequently, it is the object of the present disclosure to provide an improved hydraulic system which increases the degree of automation of a passenger restraint device, the safety and the well-being of the passengers.

The solution to the problem is achieved with a hydraulic system and a passenger restraint system according to the embodiments of the present disclosure.

The hydraulic system of the present disclosure for a passenger restraint device comprises a hydraulic pump and a hydraulic section. The hydraulic section comprises a hydraulic accumulator, a valve arrangement and a hydraulic cylinder unit with a piston. The valve arrangement is connected to the hydraulic pump, the hydraulic accumulator and the hydraulic cylinder unit. The piston can be moved between an open position and a first closed position. The hydraulic pump is configured to pressurize the hydraulic cylinder unit so that the piston moves from the first closed position to the open position. The hydraulic accumulator is configured to pressurize the hydraulic cylinder unit so that the piston moves from the open position to the first closed position. The valve arrangement can be switched to at least a first switching position and a second switching position. The hydraulic cylinder unit is pressurized by the hydraulic pump in the first switching position with a first pressure stage. The hydraulic cylinder unit is pressurized by the hydraulic pump in the second switching position with a second pressure stage, whereby the second pressure stage is lower than the first pressure stage.

In other words, the hydraulic pump opens a restraint bar of the passenger restraint device and the hydraulic accumulator closes the restraint bar to the first closed position. The open position of the piston corresponds to the open position of the passenger restraint device so that a passenger can get on and off. The first closed position of the piston corresponds to the position of the passenger restraint device in which the passenger with the largest conceivable body circumference is securely restrained. By switching between the switching positions the valve arrangement can switch in two pressure stages so that the hydraulic cylinder unit is subjected to a higher pressure when the restraint bar is opened than when the restraint bar is closed.

This allows the restraint bar to be adjusted manually by the passenger in a preferable manner when the hydraulic cylinder unit is pressurized with the second pressure stage. If, on the other hand, the hydraulic cylinder unit is pressurized with the first pressure stage, the restraint bar cannot be adjusted by the passenger. The manual adjustability of the restraint bar in the second switching position allows the passenger to adjust the position of the restraint bar according to their size and/or body circumference, so that the passenger is firmly and safely restrained by the passenger restraint device. This further increases passenger safety.

Furthermore, the hydraulic accumulator can preferably be operated at a lower pressure than the pressure of the hydraulic pump, which is required to close the restraint bar. Because the hydraulic cylinder unit is subjected to the higher pressure of the hydraulic pump when the restraint bar is opened, hydraulic fluid is fed back into the hydraulic accumulator when the piston is moved into the open position. This recharges the hydraulic accumulator so that the full accumulator pressure is available for closing the restraint bar.

The hydraulic pump is preferably configured as a fixed displacement pump, i.e. the delivery rate of the pump is constant and is not adjusted. The manufacturing costs of the hydraulic system can be reduced in comparison to an adjustable variable displacement pump, whose delivery rate can be varied. A safety pressure relief valve may be provided between the hydraulic pump and the hydraulic cylinder unit to prevent overpressure or damaging pressure peaks in the hydraulic system.

Preferably, the valve arrangement comprises a first pressure relief valve and a first directional control valve, wherein the first directional control valve blocks a flow path to the first pressure relief valve in the first switching position of the valve arrangement, and wherein the first directional control valve opens the flow path to the first pressure relief valve in the second switching position of the valve arrangement, wherein the first pressure relief valve is configured to set the second pressure stage. The second pressure stage can be preferably set by the first pressure relief valve so that it is lower than the first pressure stage. The first directional control valve preferably enables the flow path to the first pressure relief valve to be blocked when the restraint bar is opened, so that the hydraulic cylinder unit is subjected to the first pressure stage by the hydraulic pump. This prevents hydraulic fluid from flowing out via the first pressure relief valve. When the piston is in the open position, the restraint bar can thus preferably serve as a handle for passengers to get on and off, as it is held in place by the relatively high pressure in the first pressure stage.

In addition, the valve arrangement preferably comprises a second directional control valve and a second pressure relief valve, wherein the valve arrangement can be switched to a third switching position. The hydraulic cylinder unit is pressurized by the hydraulic pump in the third switching position with a third pressure stage, in that the second directional control valve blocks the flow path to the first pressure relief valve in the third switching position of the valve arrangement and releases it to the second pressure relief valve, whereby the second pressure relief valve is configured to set the third pressure stage. This makes it possible to switch preferably between the second and third pressure stages when closing the restraint bar. In the third pressure stage, the hydraulic system moves the piston from the open position to the first closed position with the aid of the hydraulic accumulator. When the first closed position is reached, the valve arrangement switches to the second switching position and thus the second pressure stage is applied, so that the restraint bar of the passenger restraint device can now be adjusted manually. This further increases the degree of automation in a preferable way and enables an improved position of the restraint bar for securely restraining the passenger.

Preferably, the hydraulic accumulator is configured to pressurize the hydraulic cylinder unit with a fourth pressure stage, whereby the fourth pressure stage is lower than the first pressure stage. In other words, the operating pressure of the hydraulic accumulator is lower than the operating pressure of the hydraulic pump. As a result, the hydraulic accumulator is preferably charged by the fluid displaced from the hydraulic cylinder unit when the piston is moved from the closed position to the open position.

In addition, the fourth pressure stage of the hydraulic accumulator is lower than the second pressure stage. The pressure difference between the fourth and second pressure stages is so small that the pressure difference can be overcome by the passenger. The passenger pulls the restraint bar towards himself and exerts additional pressure on the hydraulic cylinder unit to the already applied fourth pressure stage and against the second pressure stage. The additional pressure and the fourth pressure stage together exceed the second pressure stage set on the first pressure relief valve, so that manual closing is possible.

Preferably, the fourth pressure stage is higher than the third pressure stage. The pressure difference between the fourth pressure stage and the third pressure stage is so small that the closing movement of the restraint bar can be adjusted via the third pressure stage.

Preferably, the hydraulic cylinder unit is configured as a differential cylinder, and the hydraulic cylinder unit comprises a hydraulic cylinder housing with an interior, whereby the piston is movably disposed in the interior of the hydraulic cylinder housing. The piston separates the interior of the hydraulic cylinder housing into a first working chamber and a second working chamber, whereby the first working chamber is connected to the hydraulic accumulator and the second working chamber is connected to the hydraulic pump. As a rule, the differential cylinder has a piston rod on one side of the piston surface. As a result, the entire piston surface acts on one side of the piston and only the ring surface acts on the rod-side surface. The differential cylinder therefore has two active surfaces of different sizes. In this case, the rod-side surface points towards the second working chamber and the entire piston surface points towards the first working chamber. Due to the larger effective area, the pressure in the hydraulic accumulator can be lower, which preferably results in a more compact design. The hydraulic cylinder unit can be made more compact by configuring it as a differential cylinder.

Preferably, the valve arrangement has a third directional control valve between the hydraulic cylinder unit and the hydraulic accumulator, wherein the third directional control valve can be switched between a through position and a blocking position, wherein the third directional control valve blocks the flow path from the hydraulic cylinder unit to the hydraulic accumulator in the blocking position, but opens the flow path from the hydraulic accumulator to the hydraulic cylinder unit. In a preferable manner, the third directional control valve is switched to the through position when the restraint bar is opened and switched to the blocking position when it is closed. When the restraint bar is in its final closed position, in which the passenger is fixed, the fluid is locked in the hydraulic system. This means that the restraint bar cannot open during the ride.

Preferably, the piston can be moved manually from the first closed position to a second closed position, with the first closed position lying between the open position and the second closed position. The second closed position of the piston is variable and corresponds to the position of the passenger restraint device, in which the passenger is securely fixed according to his or her body circumference. Preferably, the restraint bar moves automatically from the open position to the first closed position so that the passenger can pull the restraint bar towards him manually until the restraint bar securely fixes the passenger.

Preferably, the valve arrangement switches to the third switching position when the piston moves from the open position to the first closed position. As a result, the pressure of the hydraulic accumulator is greater than the third pressure stage, which is set by the second pressure relief valve, and the hydraulic system preferably moves the piston automatically from the open position to the first closed position.

Preferably, the valve arrangement switches to the second switching position when the piston moves from the first closed position to the second closed position. As a result, the pressure of the hydraulic accumulator is lower than the second pressure stage, which is set by the first pressure relief valve, so that the piston can only be moved into the second closed position with additional manually applied pressure.

The first closed position of the piston is preferably adjustable. This allows the first closed position of the restraint bar to be preferably adapted to country-specific body characteristics or for children's rides, for example. The rides can also differ in terms of loads, forces or acceleration values, so that a tighter fixation of the passengers may be necessary.

In addition, the hydraulic section has a detection unit and a control unit connected to the detection unit, so that the first closed position of the piston can be set in the control unit and/or the movement of the piston from the open position to the first closed position by the hydraulic accumulator can be switched off. This makes it possible to adjust the first closed position of the piston in a preferable manner. The detection unit can, for example, comprise a piston position sensor and/or a time switch-off device. The piston position sensor detects the position of the piston in the hydraulic cylinder unit so that, for example, the valve arrangement switches from the third to the second switching position when the first closed position is reached. The time switch-off device detects the time required by the piston to be moved to the first closed position and switches the valve arrangement from the third to the second switching position after the time has elapsed.

Preferably, the hydraulic section is a first hydraulic section and the hydraulic system has at least one second hydraulic section identical to the first hydraulic section. Preferably, the first hydraulic section is connected to the second hydraulic section in such a way that the piston of the first hydraulic section can be moved independently of a piston of the second hydraulic section, with the at least one second hydraulic section being connected to the hydraulic pump. This allows several passenger restraint devices to be advantageously operated with just one hydraulic pump. Ideally, all passenger restraint devices in a ride are operated with just one hydraulic pump. This results in lower manufacturing and installation costs. To prevent mutual interference between the individual hydraulic sections, each hydraulic section comprises a non-return valve. This allows, for example, the restraint bars to be closed independently of each other.

Preferably, the hydraulic system has a tank so that hydraulic fluid flowing back from the hydraulic cylinder unit or hydraulic fluid flowing out via the pressure relief valves flows back into the tank. Preferably, the hydraulic system has a return channel connected to the tank for this purpose.

Preferably, the first, second and/or third directional control valve is electrically controllable. This preferably enables control via an electronic control unit.

It is also preferable if the third directional control valve can be operated electrically and manually. In a ride with several carriages, for example a roller coaster, the carriages are usually only supplied with power in the station, for example via a current collector. When leaving the station, the carriage is de-energized so that the third directional control valve cannot be operated electrically. If the carriage comes to a standstill on the open track or in the event of a power failure, the restraint bar can be opened by manually actuating the third directional control valve so that the passengers can leave the carriage and the ride.

Preferably, the hydraulic system comprises a non-return valve between the hydraulic cylinder unit and the hydraulic pump, which blocks the flow path from the hydraulic cylinder unit to the hydraulic pump. In combination with the blocked first directional control valve, the hydraulic fluid is locked in the hydraulic cylinder unit when the piston is in the open position. This means that the restraint bar of the passenger restraint device can be used as an entry and/or exit aid for the passenger to hold onto.

A passenger restraint system according to the disclosure comprises at least one passenger restraint device and a hydraulic system as described above. The passenger restraint system can comprise several passenger restraint devices which can be actuated via a hydraulic system, whereby each passenger restraint device is then assigned a hydraulic section.

One embodiment of the present disclosure will now be described with reference to the accompanying figures, where identical reference signs denote corresponding or identical elements in the figures.

Figure 2:
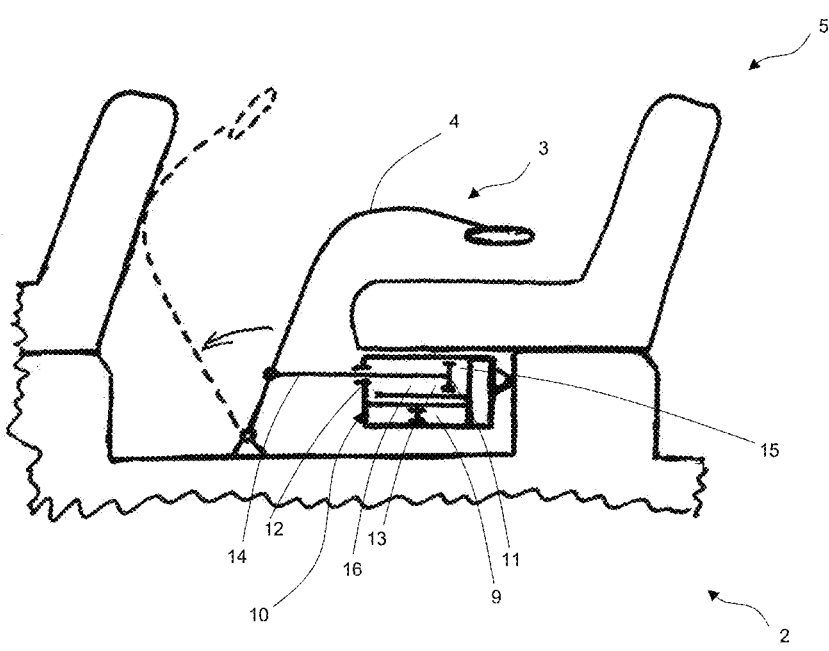
FIG. 2 is a passenger restraint system with a passenger restraint device and the hydraulic system.

FIG. 1 shows a hydraulic circuit diagram of a hydraulic system 1 for a passenger restraint device according to the present disclosure. FIG. 2 shows a passenger restraint system 2 with the passenger restraint device 3, which has a restraint bar 4 for fixing a passenger in a passenger seat 5 occupied by the passenger.

The hydraulic system 1 comprises a hydraulic pump 6, which is configured as a fixed displacement pump with a constant delivery rate. The hydraulic pump 6 can also be configured as a controlled variable displacement pump with a variable delivery rate. The hydraulic system 1 has at least one hydraulic section 5, in this exemplary embodiment there are three hydraulic sections 5, but the number is not limited to this. Each hydraulic section 7 comprises a valve arrangement 8, a hydraulic accumulator 9 and a hydraulic cylinder unit 10 with a piston 11.

As can also be seen in FIG. 1, the hydraulic system 1 comprises a tank 22 and a return channel 23 connected to the tank 22. Hydraulic fluid returning from a second working chamber 16 of the hydraulic cylinder unit 10 flows back into the tank 22 via the return supply channel 23, as will be described in more detail below.

The three hydraulic sections 7 of the hydraulic system 1 are connected to the hydraulic pump 6 via a supply channel 25 and to the tank 22 via the return channel 23.

The hydraulic cylinder unit 10 comprises a hydraulic cylinder housing 12 with an interior 13 in which the piston 11 is movable. The piston 11 has a piston rod 14, which is connected to the restraint bar 4 of the passenger restraint device 3 in order to open and close the passenger restraint device 3. The hydraulic cylinder unit 10 is configured as a differential cylinder in the present case. The piston 11 divides the interior 13 into a first working chamber 15 and a second working chamber 16. The first working chamber 15 is connected to the hydraulic accumulator 9 and the second working chamber 16 is connected to the hydraulic pump 6.

Figure 3:
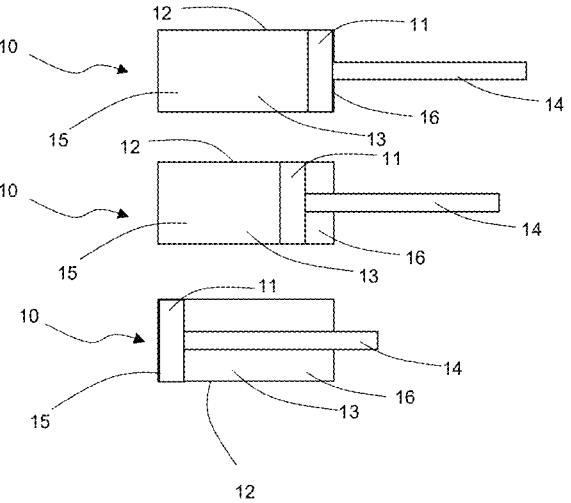
FIG. 3 is an excerpt of FIG. 1 showing a hydraulic cylinder in a first closed position, a second closed position and an open position.

The hydraulic pump 6 is configured to pressurize the second working chamber 16 of the hydraulic cylinder unit 10 in order to move the piston 11 from a first closed position (see the middle representation in FIG. 3) to an open position (see the bottom representation in FIG. 3). For this purpose, the second working chamber 16 is connected to the hydraulic pump 6 via a pressure line 28 branching off from the supply channel 25. As shown, a non-return valve 26 and an adjustable throttle valve 27 can be disposed in the pressure line 28 in order, on the one hand, to regulate the inflowing quantity and, on the other hand, to prevent a return flow to the hydraulic pump 6. This prevents interactions between the hydraulic cylinder units 10 of the respective hydraulic section 7. Due to lines of different lengths between the hydraulic pump 6 and the respective hydraulic cylinder unit 10, pressure losses can occur along the supply channel 25. In order to apply the same pressure to all hydraulic cylinder units 10, the individual hydraulic sections 7 are hydraulically balanced with each other via the adjustable throttle valve 27.

The hydraulic accumulator 9, on the other hand, is configured to pressurize the first working chamber 15 of the hydraulic cylinder unit 10 in order to move the piston 11 from the open position (see the bottom representation in FIG. 3) to the first closed position (see the middle representation in FIG. 3). The open position of the piston 11 corresponds to the position of the extended restraint bar 4 and the passenger restraint device 3 is open so that the passenger can enter and exit the passenger seat 5. The first closed position of the piston 11 corresponds to the position of the retracted restraint bar 4 to the extent that the passenger restraint device 3 is closed up to the largest conceivable body circumference of the passenger. In the open position, the piston 11 is fixed due to the relatively high pressure and can then also be used by the passenger as a handhold.

In addition, the piston 11 can be moved manually into a second closed position (see the top representation in FIG. 3). The first closed position lies between the open position and the second closed position, as can be seen in FIG. 3. The second closed position of the piston 11 is variable and corresponds to the position of the passenger restraint device 3, in which the passenger is securely restrained according to his or her body circumference. To move the piston 11 into the second closed position, the passenger pulls the restraint bar 4 from the first closed position towards them until the passenger is securely restrained.

The valve arrangement 8 can be switched to a first switching position, a second switching position and a third switching position. For this purpose, the valve arrangement 8 comprises a first pressure relief valve 17, a first directional control valve 18, a second directional control valve 19 and a second pressure relief valve 20. The first directional control valve 18 and the second directional control valve 19 are disposed in a branch line 29, which branches off between the second working chamber 16 of the hydraulic cylinder unit 10 and the hydraulic pump 6 and is connected to the return channel 23. The first directional control valve 18 is connected to the pressure line 28 and the second directional control valve 19. The second directional valve 19 is disposed downstream of the first directional valve 18 and connects the first directional valve 18 to the return channel 23 either via the first pressure relief valve 17 or via the second pressure relief valve 20 disposed in parallel thereto.

In the first switching position of the valve arrangement 8, the first directional control valve 18 blocks a flow path from the pressure channel 28 to the first pressure relief valve 17 and the hydraulic cylinder unit 10 is pressurized by the hydraulic pump 6 with a first pressure stage. This causes the piston 11 to move into the open position and the restraint bar 4 opens.

In the second switching position of the valve arrangement 8, the first directional control valve 18 opens the flow path through the branch line 29 and the second directional control valve 19 connects the first directional control valve 18 to the first pressure relief valve 17, so that the hydraulic pump 6 pressurizes the hydraulic cylinder unit 10 with a second pressure stage. The first pressure relief valve 17 is configured to set the second pressure stage. The pressure stages are selected so that the first pressure stage of the hydraulic pump 6 is higher than the second pressure stage of the first pressure relief valve 17. For example, the first pressure stage can be 100 bar and the second pressure stage can be 60 bar.

In the third switching position of the valve arrangement 8, the second directional control valve 19 connects the first directional control valve 18 to the second pressure relief valve 20. In this switching position, the hydraulic cylinder unit 10 is pressurized by the hydraulic pump 6 with a third pressure stage. The second pressure relief valve 20 is configured to set the third pressure stage, which is lower than the second pressure stage. The third pressure stage can be 20 bar, for example. The valve arrangement can therefore switch between two different pressure stages when closing the passenger restraint device 3.

The valve arrangement 8 also comprises a third directional control valve 21, which is disposed between the first working chamber 15 of the hydraulic cylinder unit 10 and the hydraulic accumulator 9. The third directional control valve 21 can be switched between a through position and a blocking position. In the through position, the flow path between the first working chamber 15 and the hydraulic accumulator 9 is open in both directions. In the blocking position, on the other hand, the flow path from the first working chamber 15 to the hydraulic accumulator 9 is blocked, but the flow path from the hydraulic accumulator 9 to the first working chamber 15 is enabled.

The hydraulic accumulator 9 is configured to pressurize the hydraulic cylinder unit 10 with a fourth pressure stage. The fourth pressure stage is lower than the second pressure stage, but higher than the third pressure stage. The fourth pressure stage can be 40 bar, for example. When the hydraulic pump 6 pressurizes the hydraulic cylinder unit 10 with the first pressure stage so that the piston 11 moves towards the open position, the third directional control valve 21 is switched to the through position so that the hydraulic fluid flows back into the hydraulic accumulator 9. This charges the hydraulic accumulator 9 in order to move the piston 11 from the open position back to the first closed position.

However, if the piston 11 is in the open position, the valve arrangement 8 is switched to the first switching position so that the first directional control valve 18 blocks the branch line 29. As a result, the hydraulic cylinder unit 10 is pressurized with the first pressure stage. Since the fourth pressure stage of the hydraulic accumulator 9 is considerably lower than the first pressure stage of the hydraulic pump 6, the passenger can support or hold on to the restraint bar 4 of the passenger restraint device 3 and thus use it as an entry and exit aid. The first pressure stage and fourth pressure stage are selected so that the sum of the fourth pressure stage and the additional pressure that the passenger exerts on the restraint bar 4 and thus on the piston 11 when getting on and off is less than the first pressure stage. As a result, the restraint bar 4 cannot be moved by the passenger against the first pressure stage.

In order to move the piston 11 from the open position to the first closed position, the valve arrangement 8 switches to the third switching position so that the third pressure stage is applied in the second working chamber 16 of the hydraulic cylinder unit 10. This enables a controlled or specifically set closing movement of the restraint bar 4. When the piston 11 reaches the first closed position, the valve arrangement 8 switches to the second switching position so that the second pressure stage is applied in the second working chamber 16.

As the second pressure stage is only slightly higher than the fourth pressure stage of the hydraulic accumulator 9, the passenger can exert sufficient pressure on the piston 11 by pulling the restraint bar 4 so that the sum of the fourth pressure stage and the pressure exerted by the passenger is greater than the second pressure stage set by the first pressure relief valve 17. This means that the piston 11 can be moved manually to the second closed position.

The first, second and third directional control valves 18, 19, 21 can each be controlled electrically. These can be controlled by an integrated control unit, for example. The third directional control valve 21 can also be actuated manually in order to open the restraint bar 4 manually in the event of a power failure. The first, second and third directional control valves 18, 19, 21 each have return springs that bias the respective directional control valve to the rest position when the respective directional control valve is not electrically actuated and is therefore de-energized. The first directional control valve 18 is preloaded in such a way that the branch line 29 is blocked. The third directional control valve 21 is preloaded into the blocking position described above, so that further closing of the restraint bar 4 is possible, but opening of the restraint bar 4 is prevented.

The hydraulic system 1 also has a third pressure relief valve 24, which connects the supply channel 25 to the tank 22. The third pressure relief valve 24 is configured to set the first pressure stage and prevent pressure peaks in order to prevent damage to the hydraulic system 1. The first pressure stage can be 100 bar, for example.

In addition, the hydraulic section 7 has a detection unit 30 and a control unit 31 connected to the detection unit 30, so that the first closed position of the piston 11 can be set in the control unit 31 and/or the movement of the piston 11 from the open position to the first closed position by the hydraulic accumulator 9 can be switched off.

Although the terms "first", "second", "third" and "fourth" are used in this document to distinguish different components, these components are not intended to be limited by these terms. These terms are only used to distinguish the components from each other and no specific order is specified. Thus, for example, a first component described above could be referred to as a second component and vice versa.

The invention claimed is:

1. A hydraulic system for a passenger restraint device, the hydraulic system comprising:

a hydraulic pump; and a hydraulic section with a hydraulic accumulator, a valve arrangement and a hydraulic cylinder unit with a piston, wherein the valve arrangement is connected to the hydraulic pump, the hydraulic accumulator and the hydraulic cylinder unit, wherein the piston is movable between an open position and a first closed position, wherein the hydraulic pump is configured to pressurize the hydraulic cylinder unit so that the piston moves from the first closed position to the open position, wherein the hydraulic accumulator is configured to pressurize the hydraulic cylinder unit so that the piston moves from the open position to the first closed position, wherein the valve arrangement can be switched into at least a first switching position and a second switching position, wherein the hydraulic cylinder unit is pressurized by the hydraulic pump in the first switching position with a first pressure stage and wherein the hydraulic cylinder unit is pressurized by the hydraulic pump in the second switching position with a second pressure stage, wherein the second pressure stage is lower than the first pressure stage.

2. The hydraulic system according to claim 1, wherein the valve arrangement comprises a first pressure relief valve and a first directional control valve, the first directional control valve blocking a flow path to the first pressure relief valve in the first switching position of the valve arrangement, and wherein the first directional control valve opens the flow path to the first pressure relief valve in the second switching position of the valve arrangement, wherein the first pressure relief valve is configured to set the second pressure stage.

3. The hydraulic system according to claim 2, wherein the valve arrangement comprises a second directional control valve and a second pressure relief valve, wherein the valve arrangement can be switched into a third switching position, the hydraulic cylinder unit being pressurized by the hydraulic pump in the third switching position with a third pressure stage, in that the second directional control valve in the third switching position blocks the flow path to the first pressure relief valve and releases it to the second pressure relief valve, the second pressure relief valve being configured to set the third pressure stage.

4. The hydraulic system according to claim 3, wherein the hydraulic accumulator is configured to pressurize the hydraulic cylinder unit with a fourth pressure stage, the fourth pressure stage being lower than the first pressure stage.

5. The hydraulic system according to claim 4, wherein the fourth pressure stage of the hydraulic accumulator is lower than the second pressure stage.

6. The hydraulic system according to claim 5, wherein the third pressure stage is lower than the fourth pressure stage.

7. The hydraulic system according to claim 3, wherein when the piston is moved from the open position into the first closed position, the valve arrangement switches into the third switching position.

8. The hydraulic system according to claim 1, wherein the hydraulic cylinder unit is configured as a differential cylinder, and the hydraulic cylinder unit comprises a hydraulic cylinder housing with an interior, the piston being movably disposed in the interior of the hydraulic cylinder housing, and the piston separates the interior of the hydraulic cylinder housing into a first working chamber and a second working chamber, wherein the first working chamber is connected to the hydraulic accumulator and the second working chamber is connected to the hydraulic pump.

9. The hydraulic system according to claim 1, wherein the valve arrangement comprises a third directional control valve between the hydraulic cylinder unit and the hydraulic accumulator, wherein the third directional control valve can be switched between a through position and a blocking position, wherein the third directional control valve blocks a flow path from the hydraulic cylinder unit to the hydraulic accumulator in the blocking position, but releases the flow path from the hydraulic accumulator to the hydraulic cylinder unit.

10. The hydraulic system according to claim 1, wherein the piston can be moved manually from the first closed position to a second closed position, the first closed position being located between the open position and the second closed position.

11. The hydraulic system according to claim 10, wherein the valve arrangement switches to the second switching position when the piston is moved from the first closed position to the second closed position.

12. The hydraulic system according to claim 1, wherein the first closed position of the piston is adjustable.

13. The hydraulic system according to claim 12, wherein the hydraulic section has a detection unit and a control unit connected to the detection unit, so that the first closed position of the piston can be set in the control unit or movement of the piston can be switched off by the hydraulic accumulator from the open position into the first closed position.

14. The hydraulic system according to claim 1, wherein the hydraulic section is a first hydraulic section and the hydraulic system comprises at least one second hydraulic section identical to the first hydraulic section, the first hydraulic section being connected to the second hydraulic section in such a way that the piston of the first hydraulic section can be moved independently of a piston of the second hydraulic section, the at least one second hydraulic section being connected to the hydraulic pump.

15. A passenger restraint system comprising at least one passenger restraint device and the hydraulic system according to claim 1.

* * * * *